(12) United States Patent
Chevrier (10) Patent No.: US 11,482,240 B2
(45) Date of Patent: *Oct. 25, 2022

(54) PRESENTATION OF COMMUNICATIONS

(71) Applicant: Sorenson IP Holdings, LLC, Salt Lake City, UT (US)

(72) Inventor: Brian Chevrier, Highland, UT (US)

(73) Assignee: Sorenson IP Holdings, LLC, Salt Lake City, UT (US)

( * ) Notice: Subject to any disclaimer, the term of this patent is extended or adjusted under 35 U.S.C. 154(b) by 345 days.

This patent is subject to a terminal disclaimer.

(21) Appl. No.: 16/650,374

(22) PCT Filed: Aug. 29, 2018

(86) PCT No.: PCT/US2018/048579
§ 371 (c)(1),
(2) Date: Mar. 24, 2020

(87) PCT Pub. No.: WO2019/060113
PCT Pub. Date: Mar. 28, 2019

(65) Prior Publication Data
US 2020/0251126 A1 Aug. 6, 2020

Related U.S. Application Data

(63) Continuation of application No. 15/714,526, filed on Sep. 25, 2017, now Pat. No. 10,224,057.

(51) Int. Cl.
*G10L 21/18* (2013.01)
*G10L 21/055* (2013.01)
(Continued)

(52) U.S. Cl.
CPC ............ *G10L 21/18* (2013.01); *G09B 21/009* (2013.01); *G10L 15/26* (2013.01); *G10L 21/055* (2013.01);
(Continued)

(58) Field of Classification Search
CPC ......... G10L 21/18; G10L 15/26; G10L 15/08; G10L 21/055; G09B 21/009; G09B 21/04;
(Continued)

(56) References Cited

U.S. PATENT DOCUMENTS

2008/0284910 A1* 11/2008 Erskine ............... H04N 5/9206
348/E7.001
2016/0295293 A1* 10/2016 McLaughlin .... H04N 21/44004

* cited by examiner

*Primary Examiner* — Huyen X Vo
(74) *Attorney, Agent, or Firm* — Maschoff Brennan (57) ABSTRACT

A method to present communications is provided. The method may include obtaining, at a device, a request from a user to play back a stored message that includes audio. In response to obtaining the request, the method may include directing the audio of the message to a transcription system from the device. In these and other embodiments, the transcription system may be configured to generate text that is a transcription of the audio in real-time. The method may further include obtaining, at the device, the text from the transcription system and presenting, by the device, the text generated by the transcription system in real-time. In response to obtaining the text from the transcription system, the method may also include presenting, by the device, the audio such that the text as presented is substantially aligned with the audio.

16 Claims, 8 Drawing Sheets

(51) Int. Cl.
*G10L 15/26* (2006.01)
*G09B 21/00* (2006.01)
*H04M 3/533* (2006.01)
*H04M 3/42* (2006.01)
*G06F 3/14* (2006.01)
*H04M 3/53* (2006.01)

(52) U.S. Cl.
CPC ... *H04M 3/42391* (2013.01); *H04M 3/53333* (2013.01); *H04M 3/53358* (2013.01); *G06F 3/14* (2013.01); *H04M 3/5315* (2013.01); *H04M 2201/14* (2013.01); *H04M 2201/22* (2013.01); *H04M 2203/252* (2013.01); *H04M 2203/305* (2013.01)

(58) Field of Classification Search
CPC .... G09B 21/00; H04M 3/42391; H04M 3/42; H04M 3/53333; H04M 3/533; H04M 3/53358; H04M 3/5315; H04M 3/53; H04M 2201/14; H04M 2201/22; H04M 2203/252; H04M 2203/305; G06F 3/14; H04N 1/324; H04N 7/147
See application file for complete search history.

PRESENTATION OF COMMUNICATIONS

CROSS-REFERENCE TO RELATED APPLICATION

This application is a continuation application of International Patent Application No. PCT/US18/48579, filed Aug. 29, 2018, the disclosure of which is incorporated herein by reference in its entirety.

FIELD

The embodiments discussed herein are related to presentation of communications.

BACKGROUND

Telephone answering machines have long been employed to answer telephone calls and record voice messages locally to a user. More recently, voicemail systems have been employed to answer telephone calls and store voice messages remotely from a user. Voice messages are generally useful because they can be stored while a user is not available and then be listened to at a time that is more convenient for the user.

However, voice messages are less useful for a hearing-impaired user because it may be difficult or impossible for the hearing-impaired user to understand the content of a voice message by simply listening to the voice message.

The subject matter claimed herein is not limited to embodiments that solve any disadvantages or that operate only in environments such as those described above. Rather, this background is only provided to illustrate one example technology area where some embodiments described herein may be practiced.

SUMMARY

A method to present communications is provided. The method may include obtaining, at a device, a request from a user to play back a stored message that includes audio. In response to obtaining the request, the method may include directing the audio of the message to a transcription system from the device. In these and other embodiments, the transcription system may be configured to generate text that is a transcription of the audio in real-time. The method may further include obtaining, at the device, the text from the transcription system and presenting, by the device, the text generated by the transcription system in real-time. In response to obtaining the text from the transcription system, the method may also include presenting, by the device, the audio such that the text as presented is substantially aligned with the audio.

BRIEF DESCRIPTION OF THE DRAWINGS

Example embodiments will be described and explained with additional specificity and detail through the use of the accompanying drawings in which.

DESCRIPTION OF EMBODIMENTS

Some embodiments in this disclosure relate to devices and methods that may be configured to present communications. In some embodiments, the communications may be messages, such as video or voice messages. It may be difficult or impossible for a hearing-impaired user to understand the content of a message, such as a video or voice message, by simply listening to the message. In order for a message to be useful to a hearing-impaired user, a transcript of the message may be generated by a remote service that caters to hearing-impaired users.

One problem with the transcription of a message is that the remote service may not have access to the message prior to the beginning of a transcription session in which the local device is connected to the remote service. As a result, the presentation of the transcription of the message and the broadcasting of audio of the message may not be synchronized. In these and other embodiments, the transcription when presented may lag the broadcasting of the message such that the broadcast audio of the message is presented before the transcription.

In some embodiments, in response to receiving a request to play a message, a device may send the message to the remote service and buffer the message until a real-time transcription begins to be received. As used herein, the term "real-time transcription" refers to real-time processing of audio data and generating a transcription of the audio data. After receipt of the transcription, the device may broadcast the buffered audio of the message concurrently with the presentation of the transcription so that the audio and the transcription are substantially synchronized.

Figure 1:
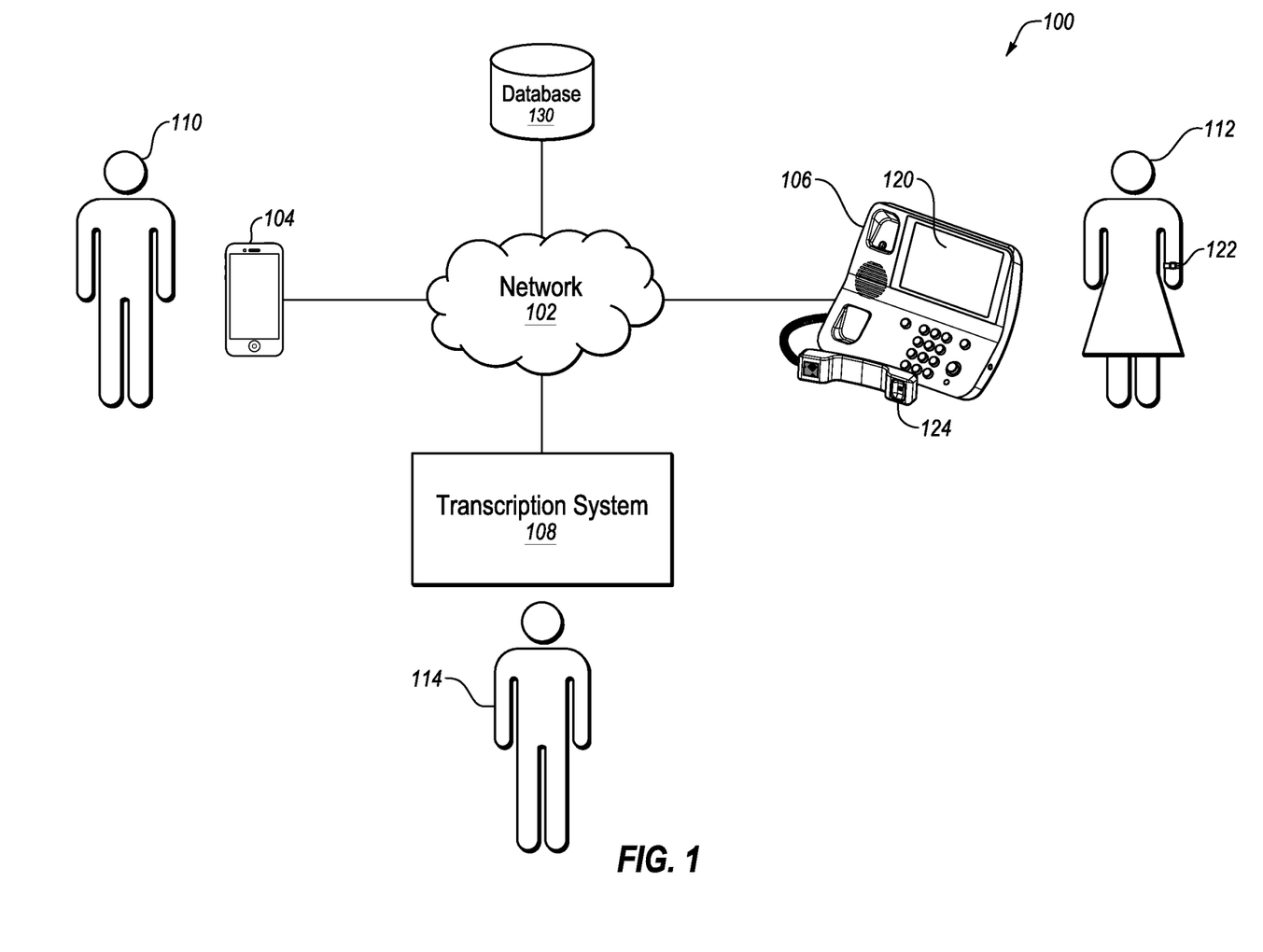
FIG. 1 illustrates an example environment for presentation of communications.

Turning to the figures, FIG. 1 illustrates an example environment 100 for presentation of communications. The environment 100 may be arranged in accordance with at least one embodiment described in the present disclosure. The environment 100 may include a network 102, a first device 104, a second device 106, a transcription system 108, and a database 130.

The network 102 may be configured to communicatively couple the first device 104, the second device 106, the transcription system 108, and the database 130. In some embodiments, the network 102 may be any network or configuration of networks configured to send and receive communications between systems and devices. In some embodiments, the network 102 may include a conventional type network, a wired or wireless network, and may have numerous different configurations. In some embodiments, the network 102 may also be coupled to or may include portions of a telecommunications network, including telephone lines, for sending data in a variety of different communication protocols, such as a plain old telephone system (POTS).

Each of the first and second devices 104 and 106 may be any electronic or digital computing device. For example, each of the first and second devices 104 and 106 may include a desktop computer, a laptop computer, a smartphone, a mobile phone, a tablet computer, a telephone, a phone console, a caption device, a captioning telephone, or any other computing device.

In some embodiments, each of the first device 104 and the second device 106 may include memory and at least one processor, which are configured to perform operations as described in this disclosure, among other operations. In some embodiments, each of the first device 104 and the second device 106 may include computer-readable instructions that are configured to be executed by each of the first device 104 and the second device 106 to perform operations described in this disclosure.

In some embodiments, each of the first and second devices 104 and 106 may be configured to establish communication sessions with other devices. For example, each of the first and second devices 104 and 106 may be configured to establish an outgoing communication session, such as a telephone call, video call, or other communication session, with another device over a telephone line or network. For example, each of the first device 104 and the second device 106 may communicate over a wireless cellular network, a wired Ethernet network, or a POTS line. Alternatively or additionally, each of the first device 104 and the second device 106 may communicate over other wired or wireless networks that do not include or only partially include a POTS. For example, a communication session between the first device 104 and the second device 106, such as a telephone call, may be a voice-over Internet protocol (VOIP) telephone call. As another example, the communication session between the first device 104 and the second device 106 may be a video communication session or other communication session.

Alternately or additionally, each of the first and second devices 104 and 106 may be configured to communicate with other systems over a network, such as the network 102 or another network. In these and other embodiments, each of the first device 104 and the second device 106 may receive data from and send data to the transcription system 108.

In some embodiments, the transcription system 108 may include any configuration of hardware, such as processors, servers, and database servers that are networked together and configured to perform a task. For example, the transcription system 108 may include multiple computing systems, such as multiple servers that each include memory and at least one processor, which are networked together and configured to perform operations of captioning communication sessions, such as telephone calls, between devices such as the second device 106 and another device as described in this disclosure. In these and other embodiments, the transcription system 108 may operate to generate transcriptions of audio of one or more parties in a communication session. For example, the transcription system 108 may generate transcriptions of audio generated by other devices and not the second device 106 or both the second device 106 and other devices, among other configurations.

In some embodiments, the transcription system 108 may operate as an exchange configured to establish communication sessions, such as telephone calls, video calls, etc., between devices such as the second device 106 and another device or devices as described in this disclosure, among other operations. In some embodiments, the transcription system 108 may include computer-readable instructions that are configured to be executed by the transcription system 108 to perform operations described in this disclosure.

Further, in some embodiments, the environment 100 may be configured to facilitate an assisted communication session between a hearing-impaired user 112 and a second user, such as a user 110. As used in the present disclosure, a "hearing-impaired user" may refer to a person with diminished hearing capabilities. Hearing-impaired users often have some level of hearing ability that has usually diminished over a period of time such that the hearing-impaired user can communicate by speaking, but that the hearing-impaired user often struggles in hearing and/or understanding others.

In some embodiments, the assisted communication session may be established between the first device 104 and the second device 106. In these embodiments, the second device 106 may be configured to present transcriptions of the communication session to the hearing-impaired user 112. As an example, the second device 106 may be one of the CaptionCall® 57T model family or 67T model family of captioning telephones or a device running the CaptionCall® mobile app. For example, in some embodiments, the second device 106 may include a visual display 120, such as a touchscreen visual display or other visual display, that is integral with the second device 106 and that is configured to present text transcriptions of a communication session to the hearing-impaired user 112.

Alternatively or additionally, the second device 106 may be associated with a visual display that is physically separate from the second device 106 and that is in wireless communication with the second device 106, such as a visual display of a wearable device 122 worn on the wrist of the hearing-impaired user 112 and configured to be in BlueTooth® wireless communication with the second device 106. Other physically separate physical displays may be visual displays of desktop computers, laptop computers, smartphones, mobile phones, tablet computers, or any other computing devices that are in wireless communication with the second device 106.

The second device 106 may also include a speaker 124, such as a speaker in a handset or a speaker in a speakerphone. The second device 106 may also include a processor communicatively coupled to the visual display 120 and to the speaker, as well as at least one non-transitory computer-readable media communicatively coupled to the processor and configured to store one or more instructions that when executed by the processor perform the methods for presentation of messages as described in this disclosure, and also store voice messages locally on the second device 106.

During a communication session, the transcription system 108, the first device 104, and the second device 106 may be communicatively coupled using networking protocols. In some embodiments, during the communication session between the first device 104 and the second device 106, the second device 106 may provide the audio received from the first device 104 to the transcription system 108. Alternatively or additionally, the first device 104 may provide the audio to the transcription system 108 and the transcription system 108 may relay the audio to the second device 106. Alternatively or additionally, video data may be provided to the transcription system 108 from the first device 104 and relayed to the second device 106.

At the transcription system 108, the audio data may be transcribed. In some embodiments, to transcribe the audio data, a transcription engine may generate a transcription of the audio. Alternatively or additionally, a remote call assistant 114 may listen to the audio received from the first device 104 at the transcription system 108, via the second device 106, and "revoice" the words of the user 110 to a speech recognition computer program tuned to the voice of the remote call assistant 114. In these and other embodiments, the remote call assistant 114 may be an operator who serves as a human intermediary between the hearing-impaired user 112 and the user 110. In some embodiments, text transcriptions may be generated by a speech recognition computer as a transcription of the audio of the user 110.

After generation of the text transcriptions, the text transcriptions may be provided to the second device 106 over the network 102. The second device 106 may display the text transcriptions on the visual display 120 while the hearing-impaired user 112 carries on a normal conversation with the user 110. The text transcriptions may allow the hearing-impaired user 112 to supplement the voice signal received from the first device 104 and confirm her understanding of the words spoken by the user 110. The transcription of a communication session occurring in real-time between two devices as discussed above may be referred to in this disclosure as a transcription communication session.

In addition to generating transcriptions of communication sessions, the environment 100 may be configured to provide transcriptions of communications from other devices, such as the first device 104. The communications may be messages, such as video messages or audio messages. The communications may be stored locally on the second device 106 or on a database 130.

For example, the second device 106 may be configured to function as a local "answering machine" in which the user 110 attempting to communicate, e.g., calling, using the first device 104 may leave a message, such as a voice or video message, on the second device 106 when a communication request to the second device 106 goes unanswered by the hearing-impaired user 112. Later, the hearing-impaired user 112 may employ the second device 106 to play back the message with real-time transcription of the voice or video message provided by the transcription system 108.

As another example, when a communication request to the second device 106 from the first device 104 goes unanswered by the hearing-impaired user 112, a message may be left by the user 110 for the hearing-impaired user 112. The message may be stored on the database 130. Later, the hearing-impaired user 112 may employ the second device 106 to play back the message with real-time transcription of the message provided by the transcription system 108. The transcription of communications from other devices, such as messages, may be referred to in this disclosure as transcription message session.

During a transcription message session, the transcription system 108 and the second device 106 may be communicatively coupled using networking protocols. In some embodiments, during the transcription message session, the second device 106 may obtain a request to present a message. The second device 106 may obtain the message. In some embodiments, the second device 106 may obtain the message from the database 130. Alternatively or additionally, the second device 106 may obtain the message from local memory that is part of the second device 106.

After obtaining the message, the second device 106 may provide audio from the message to the transcription system 108. As the second device 106 provides the audio data to the transcription system 108, the second device 106 may buffer the message. For example, when the message is a video message, the second device 106 may buffer both the video and audio of the video message and send only the audio to the transcription system 108.

As used in this disclosure, the term audio may be used generically to refer to sounds that may include spoken words. Furthermore, the term "audio" may be used generically to include audio in any format, such as a digital format, an analog format, or a soundwave format. Furthermore, in the digital format, the audio may be compressed using different types of compression schemes.

As used in this disclosure, the term video may be used generically to refer to a compilation of images that may be reproduced in a sequence to produce video. Furthermore, the term "video" may be used generically to include video in any format. Furthermore, the video may be compressed using different types of compression schemes.

At the transcription system 108, the audio from the message may be transcribed into text in a manner similar to the transcribing performed during a transcription communication session. The text may be provided to the second device 106.

In response to receiving the text from the transcription system 108, the second device 106 may determine a length to buffer the message. In these and other embodiments, the second device 106 may determine the length to buffer the message based on the time elapsed between sending the audio to the transcription system 108 and receiving the text from the transcription system 108. For example, if the second device 106 sends the audio to the transcription system 108 at time 8:01.05 and receives the first text back from the transcription system 108 at time 8:01.08, the length of the buffer may be three seconds. Alternatively or additionally, the second device 106 may determine the length to buffer the message based on a particular buffer length that was determined before the message is received.

In response to receiving the text from the transcription system 108, the second device 106 may also be configured to begin presenting the message from the buffer. Presenting the message may include broadcasting audio of the message by the speaker 124 and/or displaying video data of the message by the visual display 120. The message may continue to be buffered after receipt of the text from the transcription system 108 such that the message is presented by the second device 106 after being buffered. In these and other embodiments, the buffering length may be approximately equal to the delay between sending audio to the transcription system 108 and receiving text from the transcription system 108 that corresponds to the audio.

In response to receiving the text from the transcription system 108, the second device 106 may also be configured to display the text on the visual display 120, in real-time, while concurrently presenting the message. As a result, the presentation of the message and the presentation of the text of the transcription of the audio of the message may be substantially synchronized.

In these and other embodiments, the text may allow the hearing-impaired user 112 to supplement the audible playback of the message on the second device 106 and confirm their understanding of the words spoken in the message.

Modifications, additions, or omissions may be made to the environment 100 without departing from the scope of the present disclosure. For example, in some embodiments, the user 110 may also be hearing-impaired. In these and other embodiments, the transcription system 108 may provide text to the first device 104 based on audio transmitted by the second device 106. Alternately or additionally, the transcription system 108 may include additional functionality. For example, the transcription system 108 may edit the text or make other alterations to the text after presentation of the text on the second device 106. Alternately or additionally, in some embodiments, the environment 100 may include additional devices similar to the first and second devices 104 and 106. In these and other embodiments, the similar devices may be configured to present communications as described in this disclosure.

Figure 2A:
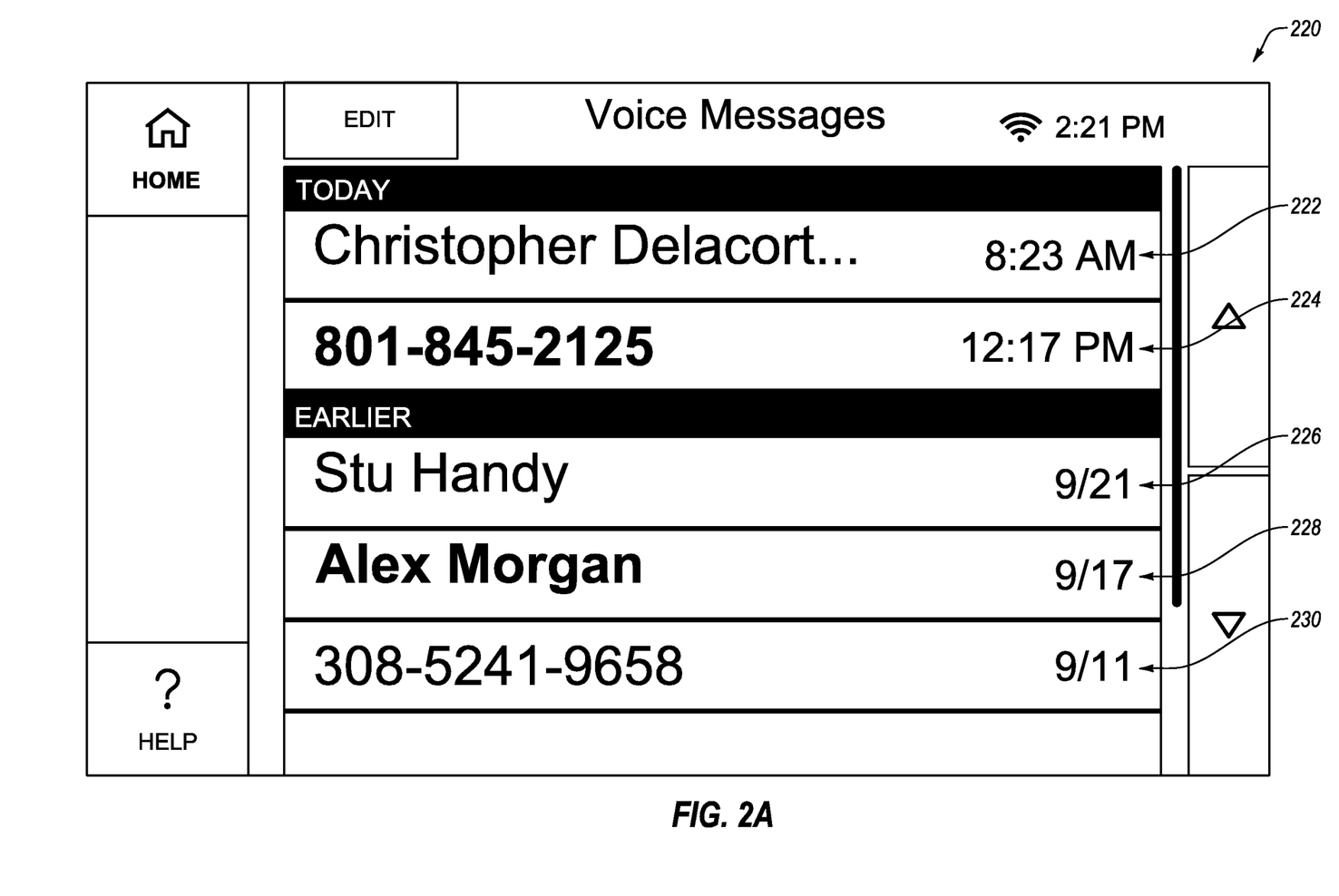
FIGS. 2A, 2B, and 2C illustrate example screens that may appear on a display of a device associated with presentation of a communication by the device.
Figure 2B:
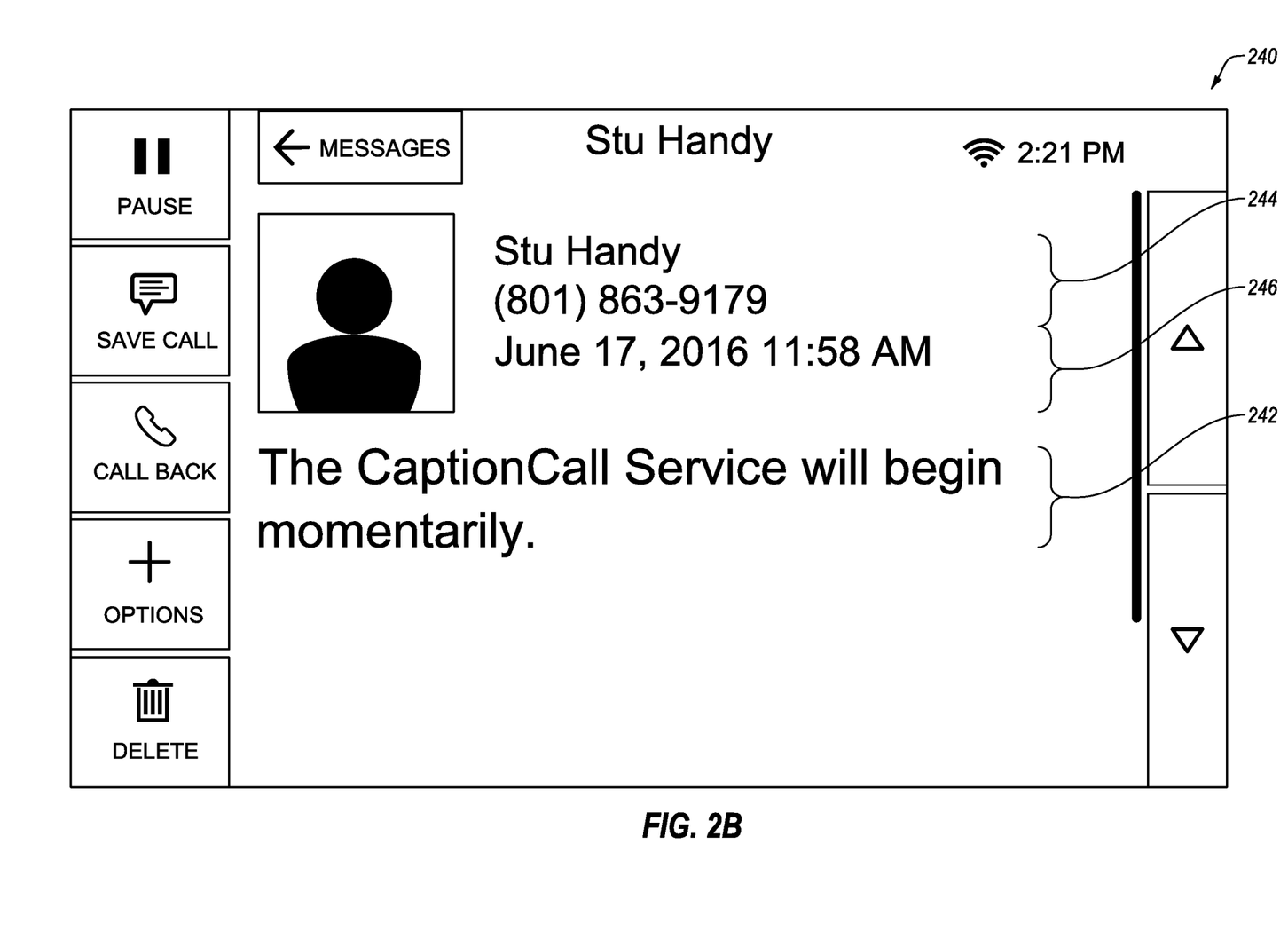
Figure 2C:
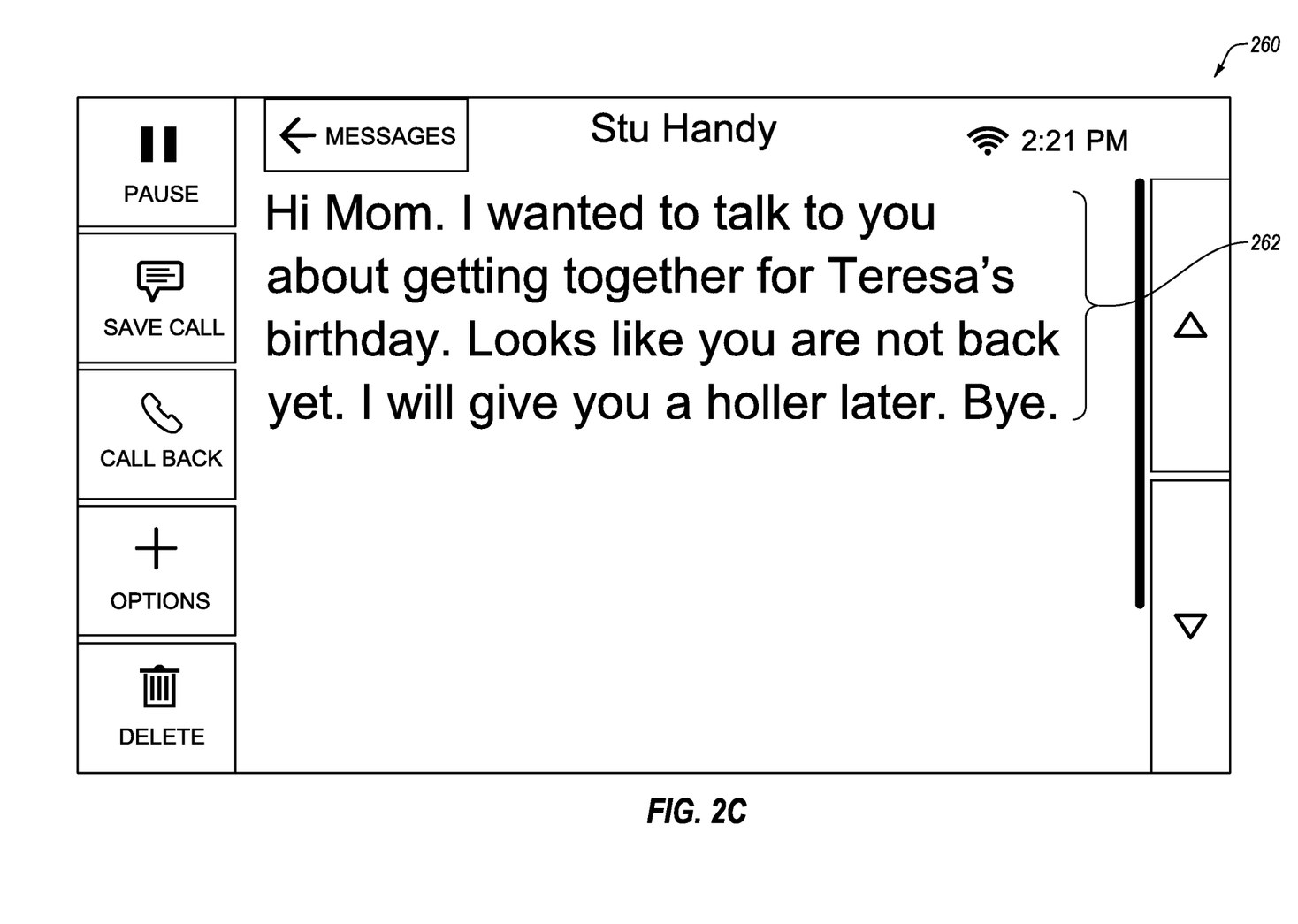

FIGS. 2A, 2B, and 2C illustrate example screens 220, 240, and 260 that may appear on a display of a device associated with presentation of a communication by the device, arranged in accordance with at least one embodiment described in the present disclosure.

The screen 220 of FIG. 2A displays voice messages 222, 224, 226, 228, and 230 that may be stored locally on a device, such as the second device 106 of FIG. 1 or stored externally, such as in the database 130 of FIG. 1. The screens 220, 240, and 260 may be displayed by a display such as the visual display 120 of the second device 106 of FIG. 1. The voice messages 224 and 230 may be designated by the phone number of the caller who left the voice message, while the voice messages 222, 226, and 228 are designated by the caller ID name of the phone number of the caller who left the voice message or by the name of a contact stored in the device that matches the phone number of the caller. Also, the voice messages 224 and 228 may be highlighted to indicate that the voice messages 224 and 228 have not yet been played back, while the voice messages 222, 226, and 230 may not be highlighted to indicate that the voice messages 224 and 228 have already been played back.

After and in response to selection of the voice message 226 on the screen 220 of FIG. 2A, the screen 220 of FIG. 2A may transition to the screen 240 of FIG. 2B. For example, the voice message 226 may be selected by the user touching the voice message 226 of the screen 220 of FIG. 2A.

At least portions of the screen 240 may appear during buffering of the audio. For example, during buffering of the audio of the voice message 226, the screen 240 may include a message 242 notifying the hearing-impaired user 112 of the delay and/or a message 244 notifying the hearing-impaired user 112 of the origin of the voice message 226 and/or a message 246 notifying a hearing-impaired user of the date and the time that the voice message 226 was created.

After buffering of the audio of the voice message 226, a transition from the screen 240 of FIG. 2B to the screen 260 of FIG. 2C may occur. The screen 260 may display text 262 of the voice message 226, as provided in real-time by a transcription system, during the playback of the voice message 226. Modifications, additions, or omissions may be made to the screens 220, 240, and 260 without departing from the scope of the present disclosure.

Figure 3:
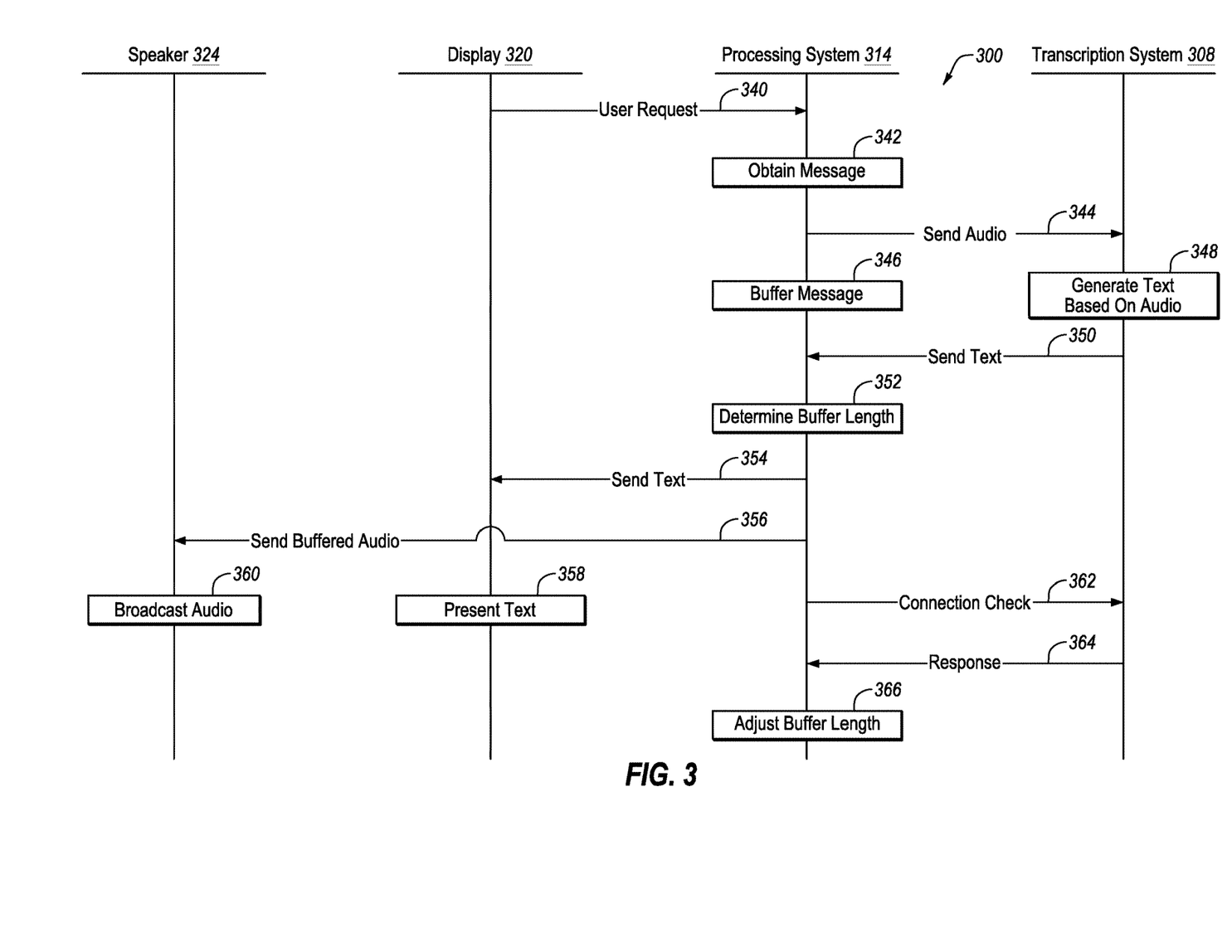
FIG. 3 illustrates example operations to present a communication.

FIG. 3 illustrates example operations 300 to present a communication. The operations 300 may be arranged in accordance with at least one embodiment described in the present disclosure. The operations 300 may be between a processing system 314, a transcription system 308, a display 320, and a speaker 324. In some embodiments, the processing system 314, the display 320, and the speaker 324 may be part of a device that may be analogous to the second device 106 of FIG. 1. In these and other embodiments, the processing system 314 may be a combination of hardware devices, such as processors, memory, modems, and other hardware devices that perform the functions described herein. Alternatively or additionally, the transcription system 308 may be analogous to the transcription system 108 of FIG. 1. Accordingly, no further explanation is provided with respect thereto.

In some embodiments, the operations 300 may be an example of communications and interactions between the processing system 314, the transcription system 308, the display 320, and the speaker 324. Generally, the operations 300 may relate to presentation of audio of a message by the speaker 324 concurrently with presentation of text of audio by the display 320. The interactions between the processing system 314 and the transcription system 308 may occur over one or more networks. The operations 300 illustrated are not exhaustive but are merely representative of operations 300 that may occur. Furthermore, one operation as illustrated may represent one or more communications, operations, and/or data exchanges.

At operation 340, the display 320 may provide a user request to the processing system 314. In some embodiments, the display 320 may be a touch screen enabled display. In these and other embodiments, the display 320 may receive an input from a user. The input from the user may be a selection of a message that was previously left for the user by another person in response to the person trying to contact the user. The message may be a voice message or a video message.

The user request may be a request for the message to be played back. In some embodiments, playing back of a message may include presenting the message to a user. Presenting the message may include presenting audio of the message by broadcasting the audio of the message through the speaker 324. Alternatively or additionally, presenting the message may include presenting video of the message by displaying the video of the message on the display 320. Alternatively or additionally, presenting the message may include presenting audio and video.

In some embodiments, presenting the message may include presenting text that corresponds with the audio in the message. For example, the audio in the message may include spoken words. The text that corresponds to the audio may be the spoken words in text form. In these and other embodiments, the text may be a transcription of the spoken words in the audio. In some embodiments, the processing system 314 may receive a user request from another input device other than the display 320.

At operation 342, the processing system 314 may obtain the message in response to receiving the user request of operation 340. In some embodiments, the message may be stored in memory that is part of the processing system 314. In these and other embodiments, the message may be stored locally in the device that includes the processing system 314. Alternatively or additionally, the message may be stored external to the device that includes the processing system 314. For example, the message may be stored in a database that may be accessed over a network. In these and other embodiments, the processing system 314 may include an identifier associated with the message. The processing system 314 may request the message from the storage location of the message using the identifier. In some embodiments, the storage location may be associated with the transcription system 308. In response to requesting the message, the processing system 314 may obtain the message.

At operation 344, the processing system 314 may send audio of the message to the transcription system 308. The processing system 314 may send the audio of the message to the transcription system 308 over a network, such as the network 102 of FIG. 1. In these and other embodiments, the processing system 314 and the transcription system 308 may not be in the same device.

In some embodiments, the message may include audio without video. In these and other embodiments, the entire message may be sent to the transcription system 308. Alternatively or additionally, the message may include audio and video. In these and other embodiments, the audio of the message may be sent to the transcription system 308.

In some embodiments, the audio may be sent to the transcription system 308 by streaming the audio to the transcription system 308. For example, the processing system 314 may be configured to send the message over a time period that is approximately equal to a playback length of the message when the message is presented to a user over the speaker 324.

In some embodiments, the audio may be sent to the transcription system 308 in chunks similar to a file transfer. The audio may be sent in a time frame based on the network connection between the transcription system 308 and the processing system 314.

At operation 346, the processing system 314 may buffer the message. The processing system 314 may start buffering the message after and in response to sending the audio to the transcription system 308.

The message may be buffered using a first in first out (FIFO) type buffer. In some embodiments, the message may be buffered after an audio stream is generated by the processing system 314 for broadcasting by the speaker 324. In these and other embodiments, the audio of the message may be provided to a codec or other processing element for generating an audio stream that may be sent to a digital-to-analog (DAC) converter to be broadcast by the speaker 324. After generation of the audio stream, the audio stream may be buffered before the audio stream is presented by the speaker 324. In some embodiments, the audio stream may be packaged for sending over a network to the transcription system 308 during operation 344.

In these and other embodiments, the entire audio stream may not be completely generated before buffering of the audio stream. Rather, as portions of the audio stream are generated, the generated portions may be buffered. For example, as a first portion of the audio stream is generated, the first portion may be buffered. As a second portion that follows the first portion is generated, the second portion may be buffered. In these and other embodiments, the first portion may have been buffered and sent to the speaker 324 before the second portion is generated and sent to the buffer. The length of buffering of the audio stream may be determined in operation 352 as explained hereafter.

When the message includes audio and video, the audio and the video that may be sent to the speaker 324 and the display 320, respectively, may be buffered before being sent to the speaker 324 and the display 320. In these and other embodiments, the video for the message may be provided to a codec or other processing element for generating a video stream for display by the display 320. In these and other embodiments, after generating the video stream and the audio stream, the video stream and the audio stream may be buffered.

The message may be buffered in real-time commensurate with how the message would be presented to the user. Thus, the message being buffered four seconds would delay presentation of the message by four seconds. In these and other embodiments, the entirety of a message may be buffered such that a message when buffered four seconds may be presented to a user four seconds after the audio is first output by the codec and finish presentation to the user four seconds after the audio is finished being output by the codec.

At operation 348, the transcription system 308 may generate text based on the audio received from the processing system 314. The transcription system 308 may generate the text using a transcription system. For example, the transcription system 308 may generate an audio stream of the audio. The audio stream may be used by the transcription system to generate the text of the audio. The text of the audio may be generated in real-time by the transcription system 308. As described, the operation 348 and the operation 346 may occur at substantially the same time. As a result, the operation 348 and the operation 346 may occur at overlapping time intervals.

At operation 350, the text generated by the transcription system 308 may be sent to the processing system 314. In some embodiments, the text may be provided as the text is generated. For example, the audio may be twenty seconds long and may include fifty spoken words, with approximately two or three words spoken every second. In these and other embodiments, the transcription system 308 may send the words of the text as the words are generated. As a result, the transcription system 308 may send the words individually or in small groups of words to the processing system 314. Thus, the transcription system 308 may stream the text to the processing system 314 at approximately the same rate that an audio stream may be generated by the processing system 314.

At operation 352, the processing system 314 may determine a length to buffer the audio stream. In some embodiments, the processing system 314 may determine the buffer length based on a time difference between when the audio is sent to the transcription system 308 and when the text is received by the processing system 314 from the transcription system 308. In these and other embodiments, the processing system 314 may have a buffer length when the processing system 314 begins buffering the audio stream. Rather, the processing system 314 may begin buffering the audio stream and may not output any audio stream until the text is received from the transcription system 308. In these and other embodiments, the transcription system 308 may then determine the buffer length and may output the audio stream from the buffer while continuing to buffer the remaining portion of the audio for the determined buffer length.

In some embodiments, the processing system 314 may determine a length to buffer the audio stream based on a previous buffer length determined for a previous message. In these and other embodiments, the previously determined buffer length may be determined based on a time to receive text back from the transcription system 308 after sending audio to the transcription system 308.

In some embodiments, the processing system 314 may determine a length to buffer the audio stream based on a particular buffer length. The particular buffer length may be length determined before a message is received. The particular buffer length may be determined based on a known average or medium time to receive text back from the transcription system 308 after sending audio to the transcription system 308. Alternatively or additionally, the particular buffer length may be determined based on known longest or shortest time to receive text back from the transcription system 308 after sending audio to the transcription system 308. Alternatively or additionally, the particular buffer length may be determined based on other factors. In some embodiments, the particular buffer length may be between one and twenty seconds. Alternatively or additionally, the particular buffer length may be between two and ten seconds or three and five seconds, or some other period of time.

At operation 354, in response to receiving the text, the processing system 314 may be configured to stream the received text to the display 320. At operation 356, the processing system 314 may be configured to send the buffered audio stream to the speaker 324. In these and other embodiments, the buffered audio stream sent to the speaker 324 and the text sent to the display 320 may occur at substantially the same time, for example, at overlapping time intervals. In these and other embodiments, the sent text and the sent buffered audio stream may correspond in that the sent text may be a transcription of the sent buffered audio stream. For example, the text sent at time T1 may be a transcription of a first portion of the audio stream sent at time T1 and the text sent at time T2 may be a transcription of a second portion of the audio stream sent at time T2.

Without buffering of the audio stream, however, the audio stream may arrive at the speaker 324 before text that corresponds to the audio stream. For example, a first portion of the audio stream may be sent at time T1 to the speaker 324 and there may be no text sent at time T1 to the display 320. As a result, at time T2, which is after time T1, the text corresponding to the audio steam sent at time T1 may be sent to the display 320 while a second portion of the audio stream is sent to the speaker 324.

At operation 358, the display 320 may display the text received from the processing system 314. At operation 360, the speaker 324 may broadcast the audio stream received from the processing system 314. The text may be displayed and the audio stream may be broadcast such that the text is substantially aligned with the audio stream. The text being substantially aligned with the audio stream may indicate that words from the audio stream are broadcast at a time approximately equal to when the text that is a transcription of the words is displayed.

At operation 362, the processing system 314 may send a network connection check to the transcription system 308. The network connection check may request a response from the transcription system 308 to allow the processing system 314 to check a network connection between the processing system 314 and the transcription system 308. For example, the processing system 314 may send a ping request to a network port of the transcription system 308.

At operation 364, the transcription system 308 may provide a response to the network connection check sent by the transcription system 308. For example, the transcription system 308 may send a ping back to the processing system 314. The processing system 314 may be configured to determine a network delay based on a time difference between the network connection check and receiving the response.

At operation 366, the processing system 314 may be configured to adjust the buffer length based on the time difference between the network connection check and the response. In some embodiments, the operations 362, 364, and 366 may occur while the processing system 314 is buffering an audio stream. In these and other embodiments, the processing system 314 may determine the buffer length initially for a message and may adjust the buffer length while the message is being presented by the speaker 324 and the display 320. Alternatively or additionally, the processing system 314 may perform the operations 362, 364, and 366 after a first message has been presented and a buffer length has been determined to further adjust the buffer length. For example, the processing system 314 may perform the operations 362, 364, and 366 in response to receiving a request to present a second message after presenting the first message.

Modifications, additions, or omissions may be made to the operations 300 without departing from the scope of the present disclosure. For example, in some embodiments, the operations 300 may not include one or more of the operations. For example, the operations 300 may not include the operations 362, 364, and 366. In some embodiments, the operations 300 may include additional operations. As another example, in some embodiments, the operations 300 may be arranged in a different order. For example, the operation 354 may occur before the operation 356.

Figure 4:
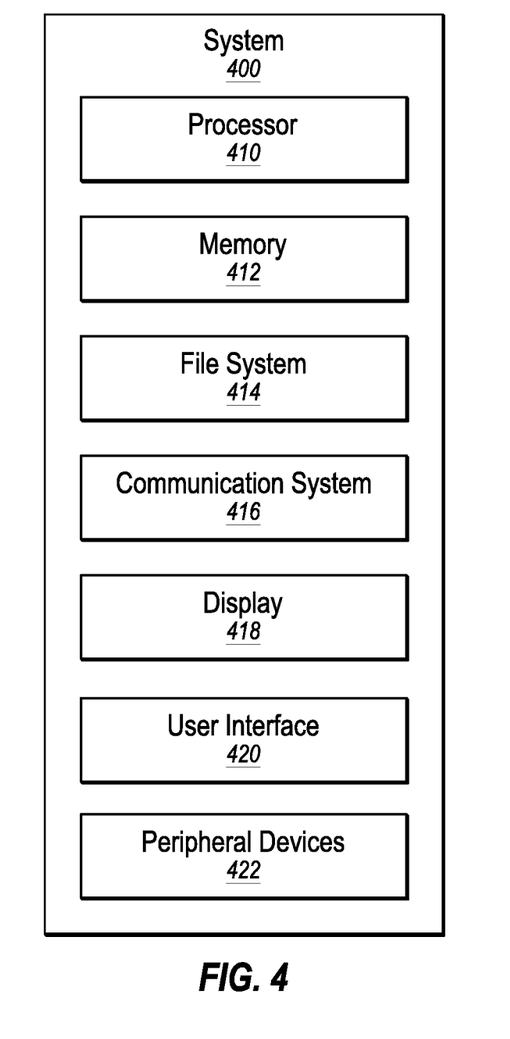
FIG. 4 illustrates an example system that may be used to present a communication.

FIG. 4 illustrates an example system 400 that may be used in automatically delaying playback of a voice message at a caption device. The system 400 may be arranged in accordance with at least one embodiment described in the present disclosure. The system 400 may include a processor 410, a memory 412, a file system 414, a communication system 416, a display 418, a user interface 420, and peripheral devices 422, which all may be communicatively coupled. In some embodiments, the system 400 may be part of any of the systems or devices described in this disclosure. For example, the system 400 may be part of any of the first device 104, the second device 106, or the transcription system 108 of FIG. 1.

Generally, the processor 410 may include any suitable special-purpose or general-purpose computer, computing entity, or processing device including various computer hardware or software modules and may be configured to execute instructions stored on any applicable computer-readable storage media. For example, the processor 410 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data, or any combination thereof.

Although illustrated as a single processor in FIG. 4, it is understood that the processor 410 may include any number of processors distributed across any number of networks or physical locations that are configured to perform individually or collectively any number of operations described herein. In some embodiments, the processor 410 may interpret and/or execute program instructions and/or process data stored in the memory 412, the file system 414, or the memory 412 and the file system 414. In some embodiments, the processor 410 may fetch program instructions from the file system 414 and load the program instructions into the memory 412.

After the program instructions are loaded into the memory 412, the processor 410 may execute the program instructions. For example, the system 400 may be part of the first device 104, the second device 106, or the transcription system 108 of FIG. 1. In these and other embodiments, the instructions may include the processor 410 buffering a message until text corresponding to audio from the message is obtained for presentation and presenting the message and the text concurrently.

The memory 412 and the file system 414 may include computer-readable storage media for carrying or having computer-executable instructions or data structures stored thereon. Such computer-readable storage media may be any available media that may be accessed by a general-purpose or special-purpose computer, such as the processor 410. By way of example, and not limitation, such computer-readable storage media may include non-transitory computer-readable storage media including Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage media which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 410 to perform a certain operation or group of operations, such as one or more operations of the operations 300 and/or one or more blocks of the methods 500 and 600.

The communication system 416 may include any component, device, system, or combination thereof that is configured to transmit or receive information over a network. In some embodiments, the communication system 416 may communicate with other devices at other locations, the same location, or even other components within the same system. For example, the communication system 416 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, etc.), plain old telephone service (POTS), and/or the like. The communication system 416 may permit data to be exchanged with a network and/or any other devices or systems described in the present disclosure.

The display 418 may be configured as one or more displays, like an LCD, LED, or other type display. The display 418 may be configured to present video, text, user interfaces, and other data as directed by the processor 410.

The user interface 420 may include any device to allow a user to interface with the system 400. For example, the user interface 420 may include a mouse, a track pad, a keyboard, a touchscreen, a telephone switch hook, volume controls, other buttons, and/or a telephone keypad, among other devices. The user interface 420 may receive input from a user and provide the input to the processor 410. In some embodiments, the user interface 420 and the display 418 may be combined as a single device such that the display 418 may display information and be an interface to allow a user to interface with the system 400.

The peripheral devices 422 may include one or more devices. For example, the peripheral devices may include a microphone, an imager, and/or a speaker, among other peripheral devices. In these and other embodiments, the microphone may be configured to capture audio. The imager may be configured to capture digital images. The digital images may be captured in a manner to produce video or image data. In some embodiments, the speaker may broadcast audio received by the system 400 or otherwise generated by the system 400.

Modifications, additions, or omissions may be made to the system 400 without departing from the scope of the present disclosure.

Figure 5:
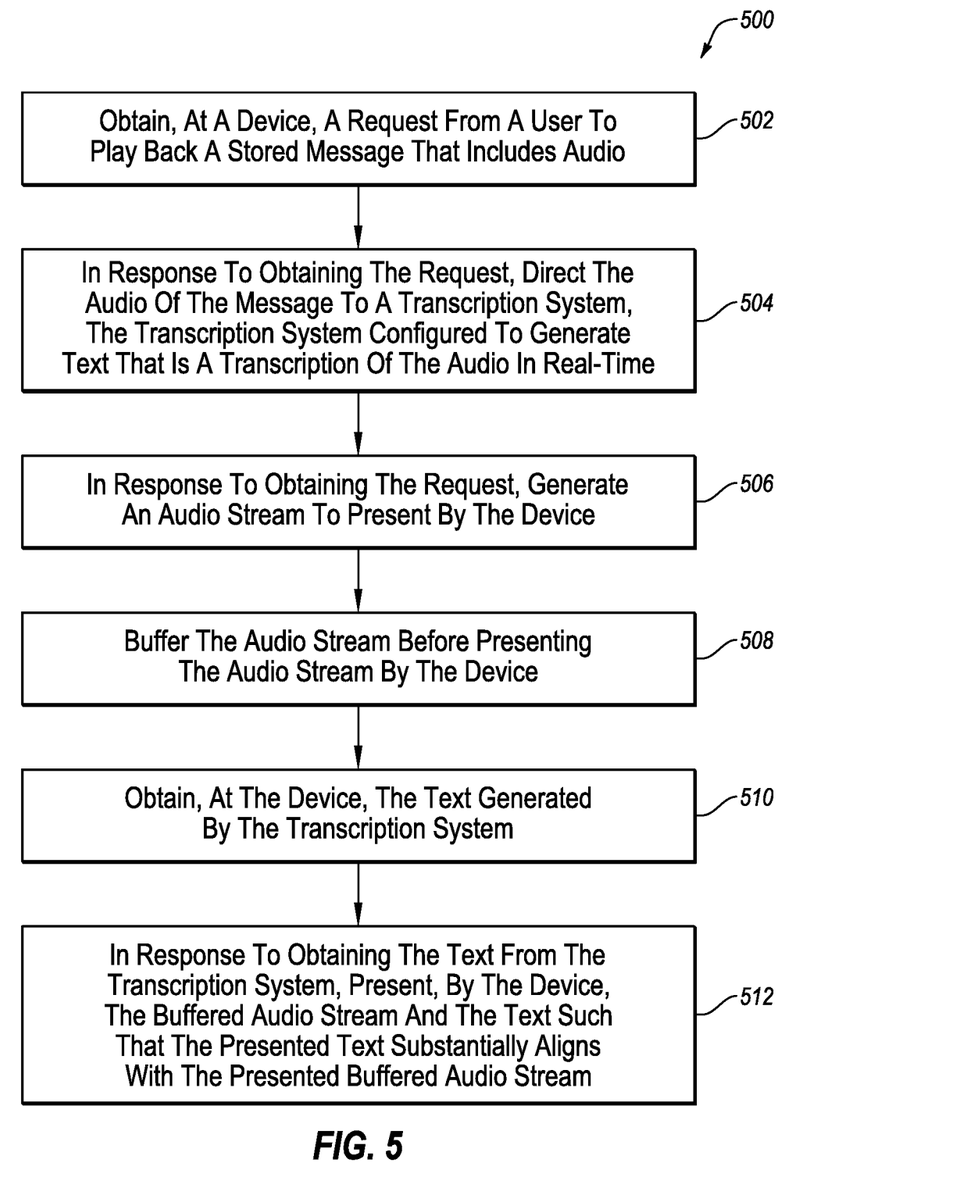
FIG. 5 is a flowchart of an example method to present a communication.

FIG. 5 is a flowchart of an example method 500 to present a communication. The method 500 may be arranged in accordance with at least one embodiment described in the present disclosure. The method 500 may be performed, in some embodiments, by a device or system, such as the first device 104 and/or the second device 106, or another device. In these and other embodiments, the method 500 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 500 may begin at block 502, where a request may be obtained at a device from a user to play back a stored message that includes audio. In some embodiments, the message may be stored at the device. Alternatively or additionally, the message may be stored outside of the device. In these and other embodiments, the method may further include obtaining, at the device, the message over a network. In these and other embodiments, the audio of the message may be directed to the transcription system after being obtained by the device.

At block 504, in response to obtaining the request, the audio of the message may be directed to a transcription system. The transcription system may be configured to generate text that is a transcription of the audio in real-time.

At block 506, in response to obtaining the request, an audio stream may be generated to be presented by the device. At block 508, the audio stream may be buffered before presenting the audio stream by the device. At block 510, the text generated by the transcription system may be obtained by the device.

At block 512, in response to obtaining the text from the transcription system, the buffered audio stream and the text may be presented by the device such that the presented text substantially aligns with the presented buffered audio stream.

It is understood that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

For example, in some embodiments, the method may further include determining a buffered length based on a time difference between providing the audio to the transcription system and obtaining the text from the transcription system. In these and other embodiments, the audio may be continually buffered based on the determined buffered length.

Figure 6:
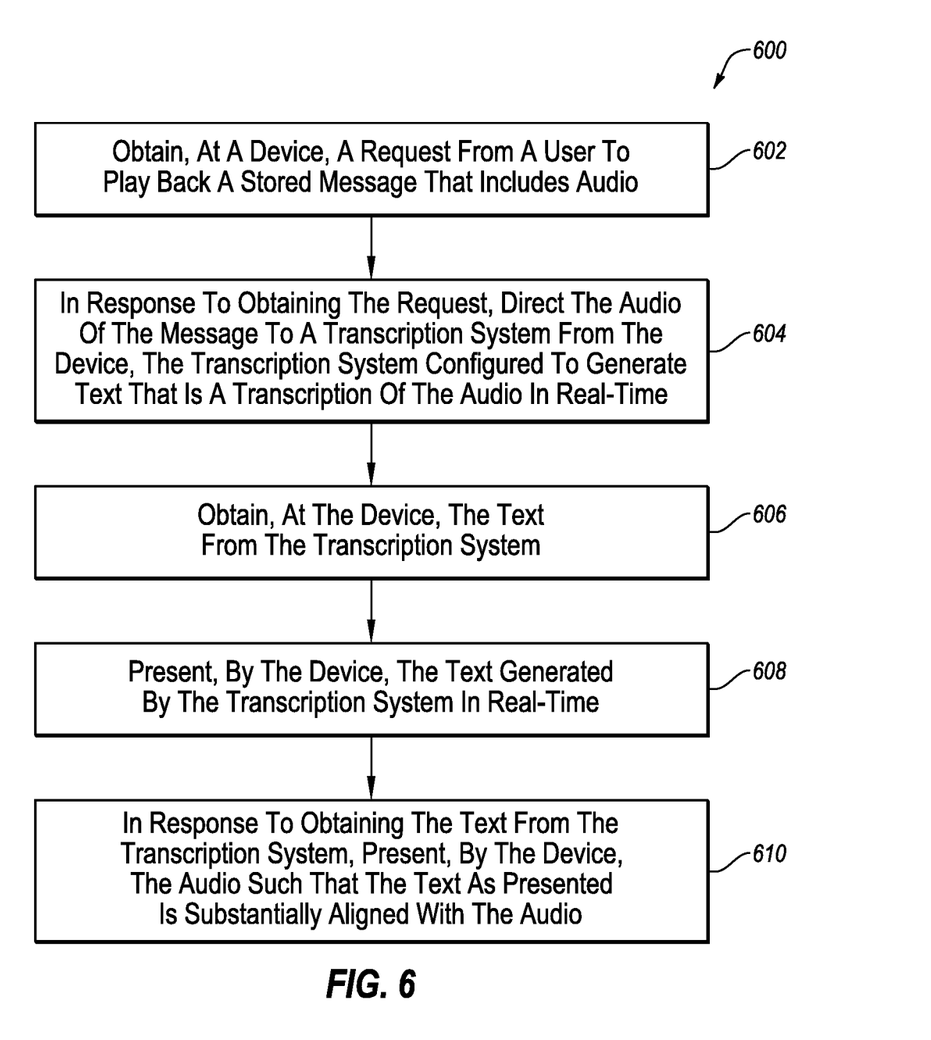
FIG. 6 is a flowchart of another example method to present a communication.

FIG. 6 is a flowchart of another example method 600 to present a communication. The method 600 may be arranged in accordance with at least one embodiment described in the present disclosure. The method 600 may be performed, in some embodiments, by a device or system, such as the first device 104 and/or the second device 106, or another device. In these and other embodiments, the method 600 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 600 may begin at block 602, where a request may be obtained at a device from a user to play back a stored message that includes audio. In some embodiments, the message may be stored at the device. Alternatively or additionally, the message may be stored outside of the device. In these and other embodiments, the method may further include obtaining, at the device, the message over a network.

At block 604, in response to obtaining the request, the audio of the message may be directed to a transcription system from the device. The transcription system may be configured to generate text that is a transcription of the audio in real-time.

At block 606, the text from the transcription system may be obtained at the device. At block 608, the text generated by the transcription system in real-time may be presented by the device.

At block 610, in response to obtaining the text from the transcription system, the audio may be presented by the device such that the text as presented is substantially aligned with the audio.

It is understood that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

For example, in some embodiments, the message may further include video. In these and other embodiments, the method may further include in response to obtaining the text from the transcription system, presenting, by the device, the video such that the text is substantially aligned with the audio and the video.

As another example, the method may further include buffering the audio at the device as the audio is directed to the transcription system such that the audio directed to the transcription system is buffered at the device. In these and other embodiments, the audio presented by the device may be the buffered audio such that the text is substantially aligned with the audio presented by the device. In these and other embodiments, the method may further include determining a buffered length based on a time difference between providing the audio to the transcription system and obtaining the text from the transcription system. In these and other embodiments, the audio may be continually buffered based on the determined buffered length. Alternatively or additionally, the method may further include after determining the buffered length, adjusting the buffered length based on a network connection between the transcription system and the device.

It is understood that the operations 300 and the methods 500 and 600 may improve the functioning of a device. For example, the functioning of the second device 106 of FIG. 1 may itself be improved by the operations 300 and the methods 500 and 600 at least because the second device 106 may be configured to better align presentation of audio and text derived from the audio by a third party.

Also, the operations 300 and the methods 500 and 600 may improve the technical field of telecommunications. For example, the technical field of telecommunications may be improved by the operations 300 and the methods 500 and 600 at least because some known devices do not properly align audio and text derived from the audio.

As indicated above, the embodiments described herein may include the use of a special purpose or general purpose computer (e.g., the processor 410 of FIG. 4) including various computer hardware or software modules, as discussed in greater detail below. Further, as indicated above, embodiments described herein may be implemented using computer-readable media (e.g., the memory 412 or file system 414 of FIG. 4) for carrying or having computer-executable instructions or data structures stored thereon.

In some embodiments, the different components, modules, engines, and services described herein may be implemented as objects or processes that execute on a computing system (e.g., as separate threads). While some of the systems and methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A device comprising:
    a display;
    a speaker;
    a processor communicatively coupled to the display and to the speaker; and
    at least one non-transitory computer-readable media communicatively coupled to the processor and configured to store one or more instructions that when executed by the processor cause the device to perform operations comprising:
        obtain, at the device, a request to play a communication that includes video and audio;
        in response to obtaining the request, direct the audio to a transcription system from the device, the transcription system configured to generate text that is a transcription of the audio in real-time;
        obtain, at the device, the text generated by the transcription system;
        determine a buffer length based on a time difference between directing the audio to the transcription system and obtaining the text from the transcription system;
        buffer the video and the audio based on the time difference;
        in response to obtaining the text from the transcription system:
            present, by the display, the text from the transcription system and the buffered video in real-time; and
            provide the buffered audio to the speaker for presentation by the speaker such that the text is substantially aligned with the buffered audio presented by the speaker.

2. The device of claim 1, wherein the communication is stored in the at least one non-transitory computer-readable media of the device.

3. The device of claim 1, wherein the communication is stored outside of the device and the operations further comprise obtain, at the device, the communication over a network, wherein the audio of the communication is directed to the transcription system after being obtained by the device.

4. The device of claim 1, wherein the operations further comprise during an interval between obtaining the request and presenting the buffered video and the buffered audio, present, on the display, a message notifying of a delay in presenting the buffered video and the buffered audio and the text.

5. The device of claim 1, wherein the operations further comprise, after determining the buffered length, adjust the buffered length based on a network connection between the transcription system and the device.

6. The device of claim 1, wherein the communication is a first communication, the operations further comprise:
    obtain, at the device, a second request to play a second communication that includes second audio;
    in response to obtaining the second request, direct the second audio to the transcription system from the device, the transcription system configured to generate second text that is a transcription of the second audio in real-time;
    buffer the second audio based on the time difference; and
    provide the buffered second audio to the speaker for presentation by the speaker without regard to the second text obtained from the transcription system.

7. A method to present communications, the method comprising:
    obtaining a communication that includes audio;
    directing the audio of the communication to a transcription system, the transcription system configured to generate text that is a transcription of the audio in real-time;
    obtaining the text from the transcription system;
    determining a buffer length based on a time difference between directing the audio to the transcription system and obtaining the text from the transcription system;
    buffering the audio based on the time difference; and
    providing the text and the buffered audio for presentation such that during the presentation the text as presented is substantially aligned with the buffered audio during real-time presentation of the text and the buffered audio.

8. The method of claim 7, wherein the communication is stored at a device that presents the text and the buffered video and the buffered audio.

9. The method of claim 7, wherein the communication is stored outside of a device that presents the text and the buffered video and the buffered audio and the method further comprises directing, to the device, the communication over a network.

10. The method of claim 7, wherein the communication further includes video and the method further comprises:
    buffering the video based on the time difference; and
    providing the buffered video for presentation.

11. The method of claim 7, further comprising after determining the buffered length, adjusting the buffered length based on a network connection with the transcription system.

12. One or more non-transitory computer-readable media configured to store one or more instructions that when executed by one or more processors cause a system to perform operations, the operations comprising:
    obtain a communication that includes audio;
    direct the audio of the communication to a transcription system, the transcription system configured to generate text that is a transcription of the audio in real-time;
    obtain the text from the transcription system;
    determine a buffer length based on a time difference between directing the audio to the transcription system and obtaining the text from the transcription system;
    buffer the audio based on the time difference; and
    provide the text and the buffered audio for presentation such that during the presentation the text as presented is substantially aligned with the buffered audio during real-time presentation of the text and the buffered audio.

13. The non-transitory computer-readable media of claim 12, wherein the communication is stored at a device that presents the text and the buffered video and the buffered audio.

14. The non-transitory computer-readable media of claim 12, wherein the communication is stored outside of a device that presents the text and the buffered video and the buffered audio and the operations further comprise direct, to the device, the communication over a network.

15. The non-transitory computer-readable media of claim 12, wherein the communication further includes video and the operations further comprise:
   buffer the video based on the time difference; and
   provide the buffered video for presentation.

16. The non-transitory computer-readable media of claim 12, further comprising after determining the buffered length, adjust the buffered length based on a network connection with the transcription system.

\* \* \* \* \*